United States Patent [19]

Inoue

[11] 4,414,456
[45] Nov. 8, 1983

[54] ELECTROEROSIVE WIRE-CUTTING METHOD AND APPARATUS WITH A SHAPED HIGH-VELOCITY STREAM OF A CUTTING LIQUID MEDIUM

[75] Inventor: Kiyoshi Inoue, Tokyo, Japan

[73] Assignee: Inoue-Japax Research Incorporated, Yokohama, Japan

[21] Appl. No.: 245,597

[22] Filed: Mar. 19, 1981

[30] Foreign Application Priority Data

May 1, 1980 [JP] Japan .................. 55-58915

[51] Int. Cl.³ .............................. B23P 1/02
[52] U.S. Cl. .................. 219/69 W; 219/69 M; 219/69 D; 204/129.6
[58] Field of Search ............... 219/69 R, 69 M, 69 D, 219/69 S, 69 V, 68; 204/129.6, 129.7

[56] References Cited

U.S. PATENT DOCUMENTS

| | | | |
|---|---|---|---|
| 3,509,304 | 4/1970 | Moore | 219/69 W |
| 4,317,019 | 2/1982 | Itoh | 219/69 D |
| 4,321,450 | 3/1982 | Inoue | 219/69 W |

FOREIGN PATENT DOCUMENTS 43-19656  8/1968  Japan .................. 219/69 D

*Primary Examiner*—M. H. Paschall
*Attorney, Agent, or Firm*—Karl F. Ross; Herbert Dubno

[57] ABSTRACT

An electroerosive wire-cutting method and apparatus wherein a high-velocity stream of the cutting liquid medium produced through a small-opening nozzle is injected into a low-velocity stream of the cutting liquid medium produced through a large-opening nozzle and directed towards the region of the gap. The high-velocity cutting-liquid stream has a thickness substantially equal to the thickness of the cutting slot being formed behind the advancing wire electrode in the workpiece and is directed at a region of the cutting gap behind the advancing wire electrode. Gases (e.g. oxygen or ozone) and/or abrasive particles may be entrained in the high velocity cutting-liquid stream.

31 Claims, 3 Drawing Figures

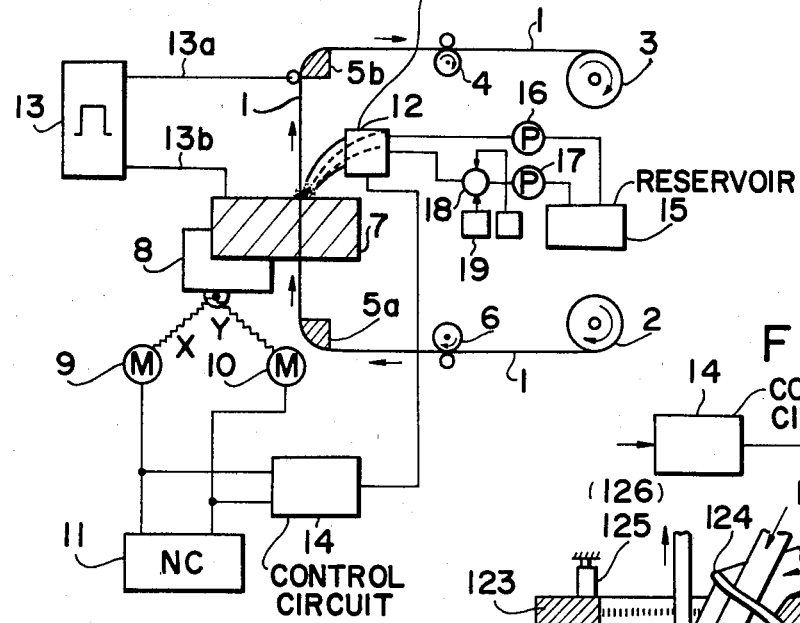
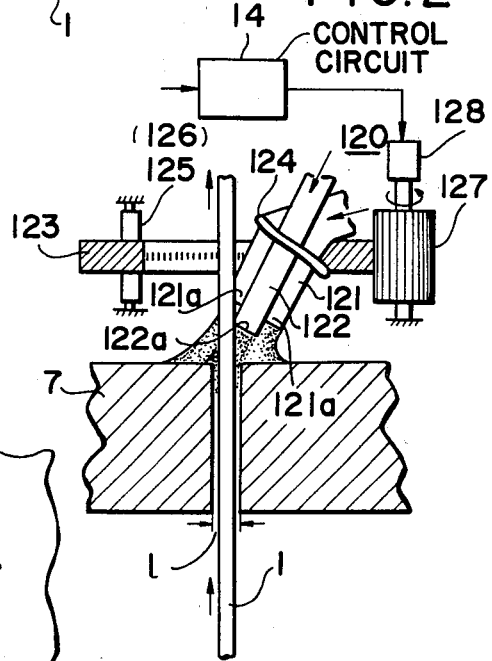
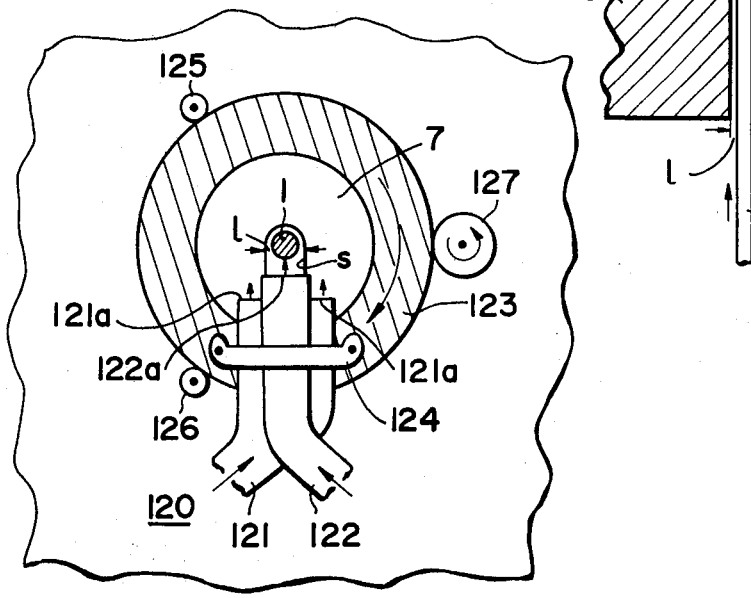

ELECTROEROSIVE WIRE-CUTTING METHOD AND APPARATUS WITH A SHAPED HIGH-VELOCITY STREAM OF A CUTTING LIQUID MEDIUM

FIELD OF THE INVENTION

The present invention relates generally to electroerosive wire-cutting and, more particularly, to a new and useful method of and apparatus for electroerosively cutting an electrically conductive workpiece with a continuous wire electrode across a cutting gap flushed with a cutting liquid medium. The invention particularly relates to a method and apparatus of the type described wherein the flushing liquid medium is supplied to the cutting gap in a novel manner to basically improve the performance of the electroerosive wire-cutting process in various aspects.

BACKGROUND OF THE INVENTION

The process of electroerosive wire-cutting generally makes use of a continuous wire electrode composed of, say, brass or copper, and having a thickness ranging between 0.05 and 0.5 mm. The wire electrode is axially transported continuously along a given continuous guide path from a supply to a takeup through a workpiece disposed in a predetermined cutting zone. The cutting zone is commonly defined by a pair of cutting guide members which support the wire electrode across the workpiece. Wire traction and braking means allow the continuous wire to be tightly stretched between the supply and takeup and to be axially driven between the cutting guide members while traversing the workpiece, thus presenting the continuously renewed electrode surface juxtaposed in a cutting relationship with the workpiece across a cutting gap. The cutting gap is flushed with a cutting liquid medium and electrically energized with a high-density electric current which is passed between the wire electrode and the workpiece to electroerosively remove material from the latter. The cutting process may be performed with any of various electroerosive machining arrangements. In electrical discharge machining (EDM), the cutting liquid medium is a dielectric liquid and the electric current is supplied in the form of a succession of electrical pulses. In electrochemical machining (ECM), the liquid medium is a liquid electrolyte and the machining current is a high-amperage continuous or pulsed current. In electrochemical-discharge machining (ECDM) the cutting medium has both electrolytic and dielectric natures and the machining current preferably is applied in the form of pulses which facilitate the production of electrical discharges through the liquid medium.

As the electroerosive material removal proceeds, the workpiece is displaced relative to the wire electrode transversely to the axis thereof. This allows the wire electrode to advance transversely to the workpiece and consequently a cutting slot to be formed behind the advancing wire electrode. The continuous relative displacement along a preselected path results in the formation of a desired contour corresponding thereto and defined by this cutting slot in the workpiece.

In performing the electroerosive wire-cutting process, the cutting zone is conveniently disposed in the air or usual environment and a nozzle is used to deliver the cutting liquid medium to the cutting gap. The cutting liquid is conveniently a water medium which may be ionized or deionized to various extents to serve as a desired electroerosive cutting medium. It is desirable to keep the cutting gap flushed with a sufficient volume of the cutting liquid and traversed thereby at a sufficient rate to allow the electroerosive action to continue with stability, the cutting chips and other gap products to be carried away with smoothness and the wire electrode to be cooled with effectiveness. This requires the cutting liquid to be projected under an elevated pressure. In the conventional arrangement in which the cutting zone or nozzle is exposed to the air, however, the cutting liquid, due to a pressure drop caused when it leaves the nozzle, tends to splash so that most of it flows out without coming into the narrow cutting gap spacing provided between the thin wire electrode and the workpiece. When the delivery of the cutting liquid to the cutting gap is insufficient or the cutting gap is incompletely filled with the cutting liquid, there develop gaseous discharges therein which impair the electroerosive process and removal of the gap products and eventually cause breakage of the wire electrode due to an excessive heat which then develop. An uncontrolled increase of the liquid pressure in an attempt to insure full delivery of the cutting liquid into the cutting gap will bring about an uncontrolled deflection or vibration of the wire electrode which again impairs the cutting stability. In short, there have been undue limitations of cutting stability and efficiency which accrue from the conventional gap flushing technique in the electroerosive wire-cutting process.

OBJECTS OF THE INVENTION

It is, accordingly, an important object of the present invention to provide an improved electroerosive wire-cutting method which assures increased cutting stability and efficiency.

A specific object of the invention is to provide an electroerosive wire-cutting method which allows a cutting liquid medium to be delivered into and passed through the narrow cutting gap spacing in a sufficient volume and at a sufficient rate of flow, thereby enabling the cutting stability and efficiency to be improved over the prior art.

A further object of the invention is to provide an electroerosive wire-cutting apparatus which is relatively simple in construction and suitable for executing the method described.

Another specific object of the invention is to provide an electroerosive wire-cutting apparatus including novel means for delivering the cutting liquid into the cutting gap, which means contributes to a marked improvement in cutting stability and efficiency over the prior art.

Other objects will become apparent from the description of the invention which follows.

SUMMARY OF THE INVENTION

In accordance with the present invention, in a first aspect thereof, there is provided a method of electroerosively cutting an electrically conductive workpiece with a continuous wire electrode, in which method the wire electrode is axially transported to traverse the workpiece while defining a cutting gap therewith flushed with a cutting liquid medium and is electrically energized to electroerosively remove material from the workpiece and the latter is advanced relative to the wire electrode transversely to the axis thereof, thereby forming a cutting slot behind the advancing wire electrode in the workpiece, and in which method the cutting gap is flushed with the cutting liquid medium by: (a) directing a low-velocity stream of the cutting liquid medium shaped with a relatively large cross section towards the region of the cutting gap and (b) directing towards the cutting gap and injecting into the low-velocity stream, a high-velocity stream of the cutting liquid medium shaped with a cross section narrower than the cross section of the low-velocity stream and having a width substantially equal to the width of the aforesaid cutting slot.

The low-velocity stream may have a pressure of 1 to 5 $Kg/cm^2$ and the high-velocity stream may have a pressure between 5 and 100 $Kg/cm^2$, preferably at least 10 $Kg/cm^2$. The cutting liquid preferably comprises water which may have a specific resistivity of $10^2$ to $10^5$ ohm-cm. The cross section of the high-velocity stream may have a width slightly greater or smaller than the width of the cutting slot and, when smaller, should be substantially equal to the thickness of the wire electrode. Preferably, the high-velocity stream of the cutting liquid medium is directed at a portion of the gap region behind the advancing electrode.

In accordance with a specific feature of the invention, the cutting liquid medium, particularly formed in the aforementioned high-velocity stream, may contain gases and/or finely divided abrasive particles. The gases can include oxygen in the form of $O_2$ or $O_3$ (ozone).

Specifically, the method according to the invention comprises producing the low-velocity stream with a first nozzle with a relatively large opening and producing the high-velocity stream with a second nozzle with an opening smaller than the opening of the first nozzle and of a width substantially equal to the width of the cutting slot. When the wire electrode is advanced relative to the workpiece along a non-linear path (i.e. a path which is curved or has one or more corners), in accordance with a further feature of the invention, at least the second of the aforementioned nozzles is displaced, preferably along a circular path arranged about the axis of the wire electrode, in response to a change in the direction of relative advance between the wire electrode and the workpiece along the non-linear path so that the high-velocity stream may always be oriented towards a portion of the gap region behind the advancing wire electrode.

The invention also provides, in a second aspect thereof, an apparatus for electroerosively cutting an electrically conductive workpiece with a continuous wire electrode, which apparatus includes means for axially transporting the wire electrode, means for guiding the wire electrode to traverse the workpiece while defining a cutting gap therewith in the presence of a cutting liquid medium, a power supply for electrically energizing the cutting gap to electroerosively remove material from the workpiece and means for advancing the workpiece relative to the wire electrode transversely to the axis thereof whereby a cutting slot is formed behind the advancing wire electrode in the workpiece, and means for flushing the cutting gap with the cutting liquid medium, which flushing means comprises: (a) a first nozzle means having a relatively large opening for producing a low-velocity stream of the cutting liquid medium and directing it towards the region of the cutting gap and (b) a second nozzle means having an opening smaller than the opening of the first nozzle means and of a width substantially equal to the width of the aforesaid cutting slot for producing a high-velocity stream of the cutting liquid medium and directing towards the cutting gap and injecting into the low-velocity stream of the cutting liquid medium, the high-velocity stream.

The width of the opening of the second nozzle means may be slightly greater or smaller than the width of the cutting slot and, if smaller, should be substantially equal to the thickness of the wire electrode.

Specifically, the apparatus further includes first pumping means for forcing the low-velocity stream of the cutting liquid medium out of the first nozzle means at a pressure between 1 and 5 $Kg/cm^2$ and second pumping means for forcing the high-velocity stream of the cutting liquid medium out of the second nozzle means at a pressure between 5 and 100 $Kg/cm^2$, preferably upwards of 10 $Kg/cm^2$. A source of water of specific resistivity between $10^2$ and $10^5$ ohm-cm, when such water is chosen to constitute the cutting liquid medium may be connected to the first and second nozzle means via first and second conduit means, respectively. Means may be associated with the second conduit means for introducing gases, e.g. oxygen in the form of $O_2$ or $O_3$, or finely divided abrasive materials into the high-velocity stream of the liquid water.

In accordance with a further important feature of the invention, at least the second of the aforementioned nozzle means is oriented in the direction of a portion of the cutting gap region behind the advancing wire electrode. To maintain this orientation for the wire electrode when caused to advance relative to the workpiece along a non-linear path (i.e. which is curved or has one or more corners) by the advancing means, nozzle displacement means may be provided and associated with the latter. The nozzle displacement means displaces at least the second of the aforementioned nozzle means so that the high-velocity stream may be always directed towards the portion of the cutting gap region behind the advancing wire electrode in spite of a change in the direction of advancement of the wire electrode relative to the workpiece. Guide means may be provided for guiding this nozzle displacement about a circular path along the axis of the wire electrode.

In accordance with the present invention, a favorable fluid distribution is provided in which an abundant and substantially breakup-free volume of the liquid medium carried in a thick, low-velocity stream under a moderate pressure fills the environment of the cutting zone and acts to isolate the latter from the atmosphere. A thin, high-velocity stream of the cutting liquid medium injected under an elevated pressure into this moving liquid curtain or pressure cushion is firmly retained therein and held thereby against substantial breakup and divergence. Furthermore, the high-velocity stream has an extremely small thickness sized to be substantially equal to the width of the cutting slot being formed behind the advancing wire electrode. Accordingly, a sufficient amount of the cutting liquid medium in the directed high-velocity stream is allowed to focus, without hindrance, at the region of the cutting gap under the elevated pressure which remains enough and to pass through the area of the cutting gap with a rate of flow which remains sufficiently high. The moving liquid curtain formed by the low-velocity stream effectively prevents the surrounding air from being trapped into the high-velocity stream of the cutting liquid medium, thus maintaining its density at a desired level and also provides a low-friction bounding layer for the high-velocity stream to allow the latter to smoothly travel towards the focused region of the cutting gap. Constant renewal of the cutting liquid medium throughout the entire area of the cutting gap achieved in this manner establishes optimum conditions for the progress of electroerosive action with stability, cooling the wire electrode and removal of the gap products.

BRIEF DESCRIPTION OF THE DRAWING

These and other objects, features and advantages of the present invention will become apparent from the following description of certain embodiments thereof made with reference to the accompanying drawing in which:

FIG. 1 is a schematic diagram partly in section and partly in a block-diagram form illustrating an electroerosive wire-cutting arrangement incorporating the principles of the present invention;

FIG. 2 is a schematic diagram essentially in section illustrating a nozzle assembly for flushing cutting liquid medium to the region of a cutting gap according to the present invention; and FIG. 3 is a plan view diagrammatically illustrating the nozzle assembly of FIG. 2.

SPECIFIC DESCRIPTION

Referring first to FIG. 1, the electroerosive wire-cutting arrangement makes use of a continuous wire electrode 1 of a known metallic composition and having a thickness of 0.05 to 0.5 mm. The wire electrode 1 is axially driven from a supply reel 2 to a takeup reel 3 by a traction unit 4 to continuously travel through a cutting zone defined between a pair of cutting guide members 5a and 5b. A suitable tension is given to the traveling wire electrode 1 by a braking unit 6. A workpiece 7 is disposed in the cutting zone between the guide members 5a and 5b and is traversed by the traveling wire electrode 1. The workpiece 7 is securely mounted on a worktable 8 which is displaced in an X-Y plane by a pair of motors 9 and 10 operated by drive signals furnished from a numerical controller 11. The motor 9 is designed to displace the workpiece 7 along a predetermined X-axis and the motor 10 is designed to displace the workpiece 7 along a predetermined Y-axis orthogonal to the X-axis. The numerical controller 11 has input data preprogrammed therein which represent a desired path to be followed by the relative displacement between the workpiece 7 and the axis of a linear stretch of the wire electrode 1 traveling between the guide members 5a and 5b. A nozzle assembly 12 which will be described later is disposed in the cutting zone to supply a cutting liquid into a region of the cutting gap defined between the wire electrode 1 and the workpiece 7. An electroerosion power supply 13 has output terminals electrically connected to the wire electrode 1 and the workpiece 7 to electrically energize the cutting gap or to apply an electric current of precisely regulated parameters between the wire electrode 1 and the workpiece 7 so that material is electroerosively removed from the workpiece 7. In operation, the data stored in the numerical controller 11 is reproduced and converted into drive signals which are applied to the motors 9 and 10, thereby displacing the workpiece 7 relative to the wire electrode 1 in the preset X-Y plane along the preprogrammed path. Thus, the wire electrode 1 stretched in a direction transverse to the X-Y plane is advanced relatively along this path, forming an electroerosion-cutting slot behind it. The continued relative displacement along this path results in the formation in the workpiece of a wire-cut contour defined by the cutting slot and corresponding to the preprogrammed path.

The nozzle assembly 12 disposed in the cutting zone constituted by the wire electrode 1 and the workpiece 7 in FIG. 1 may be embodied in a form shown at 120 in FIGS. 2 and 3. The assembly 120 comprises a first nozzle member 121 and a second nozzle member 122. The first nozzle member 121 has a large nozzle opening 121a for producing a low-velocity stream of the cutting liquid medium and directing it towards a region of the cutting gap. The second nozzle member 122 has a narrow nozzle opening 122a for producing a high-velocity stream of the cutting liquid medium. The narrow opening 122a of the second nozzle member 122 is arranged in the large opening 121a of the first nozzle member 121 and to be coaxial therewith. The narrow opening 122a of the second nozzle member 122 has a width substantially equal to the width, shown by a character 1, of the cutting slot s shown by a character S. The end of the narrow opening 122a is shown slightly projecting from the end of the large opening 121a. The assembly further includes a ring member 123 to which the first and second nozzle members 121 and 122 are fixedly secured by means of a clamp 124. The ring member 123 is rotatably guided by rollers 125 and 126 rotatably held in engagement therewith and is rotated by a roller 127 drivingly in engagement therewith. The roller 127 is rotated by a motor 128 which is in turn driven by drive signals supplied by a control circuit 14 also shown in FIG. 1. As indicated in FIG. 2, the guide rollers 125 and 126 and the driving roller 127 are secured to fixed planes, thus being in a fixed relationship with the guide members 5a and 5b and hence with the axis of the wire electrode 1 supported by these members. The rotatable ring member 123 has its center of rotation coincident with the center axis of the wire electrode 1. As the ring member 123 which carries the nozzle member 121 and 122 rotates, the direction of the low-velocity and high-velocity streams issuing from these nozzles are changed. The second nozzle 122 is directed so as to orient the high-velocity stream which issues through it at a point in the cutting gap behind the wire electrode 1 advancing in the workpiece 7, leaving the cutting slot S as seen in FIG. 3.

It is generally preferred to arrange the nozzle assembly 12, 120 on the side of the workpiece 7 in which the axially traveling wire electrode 1 enters into the workpiece 7 or such that the streams of the cutting liquid medium flow towards and into the cutting gap in the same direction in which the axially traveling wire electrode 1 enters into the workpiece 7. Optimum results have been found to be achieved when the wire electrode 1 travels from below to above the workpiece 7 as shown in FIG. 2 and the nozzle assembly 12, 120 is arranged below the workpiece 7 so that the cutting liquid medium is forced to flow into the cutting gap from below the workpiece 7.

The first and second nozzles 121 and 122 are fed with the cutting liquid medium drawn from a reservoir 15 by pumps 16 and 17, respectively. The pump 16 is used to produce through the nozzle 121 the low-velocity stream of the cutting liquid medium pressurized at a pressure of 1 to 5 Kg/cm$^2$. The pump 17 is used to produce through the nozzle 122 the high-velocity stream of the cutting liquid medium pressurized at a pressure of 5 to 100 Kg/cm$^2$, preferably upwards of 10 Kg/cm$^2$. The low-velocity stream from the first nozzle 121 may be divergent to cover a relatively large area surrounding the region of the cutting gap and the wire electrode 1 going out of the cutting slot s (as shown) or coming into the cutting slot s (when its direction of axial travel is reversed). There is practically no breakup or scattering in this stream which has both a low rate of flow and pressure as it is projected out of the nozzle 121. Thus, an abundant and substantially breakup-free volume of the liquid medium is carried in the low-velocity stream to fill the environment of the cutting region and to isolate the latter from the atmosphere. The second nozzle member 122 has the nozzle opening 122a sized to provide a thickness of the high-velocity stream substantially equal to the width of the cutting slot S. The high-velocity stream injected by the nozzle 122 into the low-velocity stream which acts as a moving "liquid curtain" and "pressure cushion" is thus firmly retained therein and held thereby against substantial breakup and divergence. Accordingly, a sufficient amount of the cutting liquid medium in the directed high-velocity stream is allowed to focus, without hindrance, at the region of the cutting gap under the pressure which remains enough and to pass through the area of the cutting gap with a rate of flow which remains sufficiently high. The moving "liquid curtain" served by the low-velocity stream effectively prevents the surrounding air from being trapped into the high-velocity stream of the cutting liquid medium, thus maintaining its density at a desired level and also provides a low-friction partition for the high-velocity stream to allow the latter to smoothly travel towards the focused region of the cutting gap. Constant renewal of the cutting liquid medium throughout the entire area of the cutting gap achieved in this manner establishes optimum conditions for the progress of electroerosion action with stability, cooling the wire electrode 1 and removal of the gap products.

While the traveling wire electrode 1 traversing the workpiece 7 is tightly stretched between the cutting guide members 5a and 5b, the wire electrode 1 in the cutting zone while advancing tends to be deflected backwards due to a machining pressure (i.e. discharge pressure or gaseous expansion pressure) inherent in the electroerosion process. This deflection may cause a short-circuit condition between the wire electrode 1 and the workpiece 7 or uncontrolled vibrations of the stretched wire electrode, both of which are undesirable. In order to counter balance this machining pressure, it is desirable, as mentioned before, to keep the high-velocity stream of the cutting liquid medium oriented at an area in the cutting gap immediately behind the advancing wire electrode 1 as shown in FIG. 3. As long as the wire electrode is advancing along a straight path, this orientation is maintained with the position of the nozzle member 122 fixed as shown. When the wire electrode is to advance along a curved path or a corner defined by two straight or curved lines connected together, the position of the nozzle member 122 must be changed to maintain this counterbalancing orientation.

The control circuit 14 (FIGS. 1 and 2) is adapted to receive control signals of the numerical controller 11 which are applied to drive motors 9 and 10 for the worktable 8, that is for the workpiece 7. These signals define a desired contouring path of advance of the workpiece 7 relative to the wire electrode 1 and hence of advance of the wire electrode 1 relative to the workpiece. The control circuit 14 derives from these signals an "angular" sensing signal which represents an angle of the tangent to the contouring path at each preset point thereon with respect to a predetermined coordinate axis and, from this "angular" sensing signal, produces an "angular" drive signal to be furnished to the motor 128. Thus, when a change in the direction of advance of the wire electrode occurs in the contouring path, an "angular" drive signal is provided to the motor 128 to rotate the ring member 123 and hence to alter the angular position of the nozzle member 122 carried thereon. The drive signal continues until the nozzle member 122 takes a position at which the desired orientation of the high-velocity stream is achieved.

The cutting liquid medium may advantageously be a water liquid having a specific resistivity ranging between $10^2$ and $10^5$ ohm-cm. The liquid medium may contain gases and/or fine abrasive particles. In the arrangement of FIG. 1, a mixing chamber 18 is therefore provided at a portion of the liquid conduit through which the cutting liquid medium, e.g. a water liquid, is passed under a high pressure exerted by the pump 17 to produce through the nozzle (second nozzle 122 in FIGS. 2 and 3) the high-velocity stream which is directed at a portion of the cutting gap behind the advancing wire electrode 1. The gases which preferably include oxygen in the form of either $O_2$ or $O_3$ (ozone) are supplied from a source 19 and introduced at the mixing chamber 18 into the high-velocity stream. It has been found that ozone is particularly advantageous, when contained at a proportion of 10 to 55% by volume in the high-velocity, cutting liquid stream, to improve the removal rate and cutting stability. The abrasive particles which may be $SiO_2$, $B_4C$, $Al_2O_3$ or any other abrasive grains are supplied from a source 20 and introduced at the mixing chamber 18 into the high-velocity stream.

There are thus provided, in accordance with the present invention, new and useful electroerosive wire-cutting method and apparatus.

What is claimed is:

1. In a method of electroerosively cutting an electrically conductive workpiece with a continuous wire electrode, wherein the wire electrode is axially transported to traverse the workpiece to define a cutting gap therewith flushed with a cutting liquid medium and is electrically energized to electroerosively remove material from the workpiece while the latter is displaced relative to the wire electrode transversely to the axis thereof, thereby forming a cutting slot behind the advancing wire electrode in the workpiece, the improvement which comprises flushing said cutting gap with said cutting liquid medium by:
   (a) directing at a region of said cutting gap a high-velocity columnar stream of the cutting liquid medium having a width substantially equal to the width of said cutting slot at least in the direction of the latter width; and
   (b) directing towards the region of said cutting gap in generally the same direction as the high-velocity columnar stream, a low-velocity stream of the cutting liquid medium so as to surround said high-velocity columnar stream and thereby to form a protective curtain about said high-velocity columnar stream and a pressure cushion to force the latter substantially in its entirety to pass into said cutting slot and said cutting gap without breakup or divergence.

2. The improvement defined in claim 1 wherein said low-velocity stream has a pressure of 1 to 5 kg/cm$^2$, and said high-velocity stream has a pressure of 10 to 100 kg/cm$^2$.

3. The improvement defined in claim 1 wherein said cutting liquid medium comprises water.

4. The improvement defined in claim 3 wherein said water has a specific resistance ranging between $10^2$ and $10^5$ ohm-cm.

5. The improvement defined in claim 4 wherein said high-velocity stream of said water medium has gases entrained therein.

6. The improvement defined in claim 5 wherein said gases are oxygen introduced into said water medium at a proportion of 10 to 55% by volume.

7. The improvement defined in claim 6 wherein said oxygen is ozone.

8. The improvement defined in claim 4 wherein said high-velocity stream of said water medium has finely divided abrasive particles entrained therein.

9. The improvement defined in claim 1 wherein said high-velocity stream is slightly greater in width than said cutting slot at least in said direction.

10. The improvement defined in claim 1 wherein said high-velocity stream is slightly smaller in width than said cutting slot at least in said direction.

11. The improvement defined in claim 10 wherein the width of said high-velocity stream is substantially equal, at least in said direction, to the thickness of said wire electrode.

12. The improvement defined in claim 1 wherein in the step (a) said high-velocity stream of the cutting liquid medium is directed towards a portion of said gap region behind said advancing wire electrode.

13. In a method of electroerosively cutting an electrically conductive workpiece with a continuous wire electrode, wherein the wire electrode is axially transported to traverse the workpiece to define a cutting gap therewith flushed with a cutting liquid medium and is electrically energized to electroerosively remove material from the workpiece while the latter is displaced relative to the wire electrode transversely to the axis thereof, thereby forming a cutting slot behind the advancing wire electrode in the workpiece, the improvement which comprises flushing said cutting gap with said cutting liquid medium by:
(a) directing at a region of said cutting gap a high-velocity columnar stream of the cutting liquid medium having a width substantially equal to the width of said cutting slot at least in the direction of the latter width; and
(b) directing towards the region of said cutting gap a low-velocity stream of the cutting liquid medium generally in the same direction as the high velocity columnar stream so as to surround said high-velocity columnar stream and thereby to form a protective curtain about said high-velocity columnar stream and a pressure cushion to force the latter substantially in its entirety to pass into said cutting slot and said cutting gap without breakup or divergence,
step (a) comprising producing said high-velocity columnar stream with a first nozzle with a nozzle opening of a width substantially equal to the width of said cutting slot at least in the direction of the latter width and step (b) comprising producing said low-velocity stream with a second nozzle with a nozzle opening wider in cross section than the nozzle opening of said first nozzle at least in said direction.

14. The improvement defined in claim 13 wherein said first nozzle and said second nozzle are coaxial with each other at least in their nozzle openings.

15. The improvement defined in claim 13 wherein said wire electrode is advanced relative to said workpiece along a nonlinear path, further comprising displacing at least the first of said nozzles in response to a change in the direction of advance of said wire electrode relative to said workpiece along said nonlinear path so that said high-velocity stream may always be directed towards a portion of said gap region behind said advancing wire electrode.

16. The improvement defined in claim 15 wherein at least the first of said nozzles is displaced along a circular path arranged about the axis of said wire electrode.

17. In an apparatus for electroerosively cutting an electrically conductive workpiece with a continuous wire electrode, having means for axially transporting the wire electrode, means for guiding said wire electrode to traverse the workpiece while defining a cutting gap therewith in the presence of a cutting liquid medium, a power supply for electrically energizing the cutting gap to electroerosively remove material from the workpiece and means for advancing the workpiece relative to the axially transported wire electrode transversely to the axis thereof whereby a cutting slot is formed behind the advancing wire electrode in the workpiece, the improvement which comprises means for flushing said cutting gap with said cutting liquid medium, said flushing means comprising:
(a) first nozzle means for directing at a region of said cutting gap a high-velocity columnar stream of the cutting liquid medium having a width substantially equal to the width of said cutting slot; and
(b) second nozzle means for directing towards the region of said cutting gap a low-velocity stream of the cutting liquid medium generally in the same direction as the high velocity columnar stream so as to surround said high-velocity columnar stream and thereby to form a protective curtain about said high-velocity columnar stream and/or pressure cushion to force the latter substantially in its entirety to pass into said cutting slot and said cutting gap without breakage or divergence.

18. The improvement defined in claim 17 wherein the means (a) includes a first nozzle with a nozzle opening of a width substantially equal to the width of said cutting slot at least in the direction of the latter width, and the means (b) includes a second nozzle with a nozzle opening wider in cross section than the nozzle opening of said first nozzle at least in said direction.

19. The improvement defined in claim 18 wherein said first nozzle and said second nozzle are coaxial with each other at least in their nozzle openings.

20. The improvement defined in claim 18 wherein the nozzle opening of said first nozzle is slightly greater in width than said cutting slot at least in said direction.

21. The improvement defined in claim 18 wherein the nozzle opening of said first nozzle is slightly smaller in width than said cutting slot at least in said direction.

22. The improvement defined in claim 21 wherein the width of the nozzle opening of said first nozzle is substantially equal, at least in said direction, to the thickness of said wire electrode.

23. The improvement defined in claim 18 wherein means (a) further include first pumping means for forcing said high-velocity stream of the cutting liquid medium out of said first nozzle at a pressure between 10 and 100 kg/cm$^2$ and means (b) further includes second pumping means for forcing said low-velocity stream of the cutting liquid medium out of said second nozzle at a pressure between 1 and 5 kg/cm$^2$.

24. The improvement defined in claim 23, further comprising a source of water of a specific resistance between 10$^2$ and 10$^5$ ohm-cm constituting said cutting liquid medium, said source being connected to said first and second nozzles via first and second conduit means, respectively.

25. The improvement defined in claim 24, further comprising means associated with said first conduit means for introducing gases into said high-velocity stream of the water.

26. The improvement defined in claim 25 wherein said gases include an oxygen gas.

27. The improvement defined in claim 26 wherein said oxygen gas is ozone.

28. The improvement defined in claim 24, further comprising means associated with said first conduit means for introducing finely divided abrasive particles into said high-velocity stream of water.

29. The improvement defined in claim 18, further comprising means for orienting at least the first of said nozzles in the direction of a portion of said cutting gap region behind the advancing wire electrode.

30. The improvement defined in claim 29 wherein said wire electrode is advanced relative to said workpiece along a nonlinear path, by said advancing means, said orienting means including drive means associated with said advancing means for displacing at least the first of said nozzles so that said high-velocity stream may be always directed towards said portion of said cutting gap region in spite of change in the direction of advancement of said wire electrode relative to said workpiece.

31. The improvement defined in claim 30, further comprising guide means for permitting at least the first of said nozzles to be displaced along a circular path about the axis of said wire electrode.

* * * * *